(12) United States Patent
Liu et al.

(10) Patent No.: US 11,509,975 B2
(45) Date of Patent: Nov. 22, 2022

(54) COMMUNICATION PATCH PANEL AND COMMUNICATION RACK SYSTEM

(71) Applicant: CommScope Technologies LLC, Hickory, NC (US)

(72) Inventors: Zhihui Liu, Jiangsu (CN); Danny Ghislain Thijs, Zonhoven (BE); Wenyong Wu, Jiangsu (CN); Yu Zhao, Jiangsu (CN); Jing Wang, Jiangsu (CN)

(73) Assignee: Commscope Technologies LLC, Hickory, NC (US)

( * ) Notice: Subject to any disclaimer, the term of this patent is extended or adjusted under 35 U.S.C. 154(b) by 0 days.

(21) Appl. No.: 16/952,465

(22) Filed: Nov. 19, 2020

(65) Prior Publication Data
US 2021/0160592 A1  May 27, 2021

(30) Foreign Application Priority Data
Nov. 22, 2019 (CN) .......................... 201911153321.4

(51) Int. Cl.
*H04Q 1/02* (2006.01)
*H01R 13/73* (2006.01)
*H01R 13/518* (2006.01)

(52) U.S. Cl.
CPC ........... *H04Q 1/131* (2013.01); *H01R 13/518* (2013.01); *H01R 13/73* (2013.01); *H04Q 1/09* (2013.01); *H01R 2201/04* (2013.01)

(58) Field of Classification Search
CPC . H04Q 1/131; H04Q 1/13; H04Q 1/09; H01R 13/73; H01R 13/518; H01R 2201/04
See application file for complete search history.

(56) References Cited

U.S. PATENT DOCUMENTS

| | | | | |
|---|---|---|---|---|
| 5,129,842 A * | 7/1992 | Morgan | ................. | H01R 13/73 439/532 |
| 5,975,962 A * | 11/1999 | Laukonis | ............. | H01R 13/518 439/713 |
| 6,086,415 A * | 7/2000 | Sanchez | ............... | H01R 13/465 439/540.1 |
| 7,534,135 B2 | 5/2009 | Follingstad | | |
| 9,720,195 B2 * | 8/2017 | Giraud | ................. | G02B 6/4452 |
| 9,775,260 B1 * | 9/2017 | Warlick | ............... | H05K 7/1489 |
| 2004/0056155 A1 * | 3/2004 | Chen | ..................... | H02G 11/00 248/49 |
| 2008/0176445 A1 | 7/2008 | Shifris et al. | | |
| 2009/0305554 A1 | 12/2009 | Siano | | |

FOREIGN PATENT DOCUMENTS

JP            2012104650 A  *  5/2012

* cited by examiner

Primary Examiner — Briggitte R. Hammond
(74) Attorney, Agent, or Firm — Merchant & Gould P.C.

(57) ABSTRACT

The present invention relates to a communication patch panel and a communication rack system having the communication patch panel. The communication patch panel includes a panel body (2) having two ends as well as a front side (21) and a rear side. The communication patch panel includes two fittings (3), each of which is configured to be mounted on a communication rack (20) and to be detachably connected to one of the ends of the panel body, wherein each of the fittings provides a plurality of transverse positions for the detachable connection. A plurality of different positionings of the panel body may be flexibly realized in the communication patch panel.

21 Claims, 6 Drawing Sheets

COMMUNICATION PATCH PANEL AND COMMUNICATION RACK SYSTEM

CROSS-REFERENCE TO RELATED APPLICATION

This application claims the benefit of Chinese Patent Application No. 201911153321.4, filed on Nov. 22, 2019, the disclosure of which is incorporated herein by reference in its entirety.

TECHNICAL FIELD

The present invention relates to the technical field of a communication device, and more particularly to a communication patch panel and a communication rack system.

BACKGROUND ART

Communication patch panels are well known in the technical field of a communication device. A communication patch panel may integrate many communication ports into a single element that may connect input and output lines of a communication system. A typical communication patch panel comprises a panel body having two ends as well as a front side and a rear side, wherein the two ends are configured for connection with communication racks, the front side is configured for connection with the input lines, and the rear side is configured for connection with the output lines.

SUMMARY OF INVENTION

It is an object of the present invention to provide a communication patch panel that enables improved versatility of the communication patch panel. Another object of the present invention is to provide a communication rack system having such a communication patch panel.

Accordingly, a communication patch panel is proposed. The communication patch panel includes a panel body having two ends as well as a front side and a rear side. The communication patch panel includes two fittings, each of which is configured to be mounted on a communication rack and to be detachably connected to one of the ends of the panel body, wherein each of the fittings provides multiple transverse positions for the detachable connection.

By way of a plurality of mounting positions for each of the two ends of the panel body on the respective fittings, many positionings of the panel body may be realized, so that a desired positioning may be flexibly selected from these positionings. For example, by appropriately selecting a mounting position for each of the two ends of the panel body on the two fittings, it is possible to realize a position of the panel body in parallel with respect to a width direction of the rack or a position inclined with respect to the width direction of the rack.

In some embodiments, each of the fittings may include multiple mounting holes.

In some embodiments, the plurality of mounting holes may be distributed in a transverse direction.

In some embodiments, the plurality of mounting holes may be uniformly distributed in the transverse direction in the respective fittings.

In some embodiments, the fittings may include an elongated hole extending in a transverse direction, which may provide a plurality of predetermined transverse positions or continuous arbitrary transverse positions. The elongated hole may be provided with a scale by which a current transverse position may be clearly known.

In some embodiments, the number of the mounting holes in each of the fittings may be two, three, four, or more.

In some embodiments, the two fittings may have the same layout of mounting holes.

In some embodiments, the mounting holes of the two fittings may be mirror symmetrical to each other.

In some embodiments, the detachable connection may be a bolted connection.

In some embodiments, the detachable connection may be achieved by a locking element, wherein the locking element is moveable between a locked position in which the detachable connection is locked, and an unlocked position in which the detachable connection is released.

In some embodiments, the detachable connection may be achieved in the form of a snap-fit connection by a snap-fit element.

In some embodiments, the panel body may include a bolt hole for receiving a bolt.

In some embodiments, the bolt head of the bolt and the bolt hole may have spherical surfaces mated with each other. By these spherical surfaces, it is possible to vary the orientation of the bolt head so that the bolted connection can be easily established.

In some embodiments, the plurality of mounting holes may be threaded holes with internal threads so that a separate nut may be spared.

In some embodiments, the communication patch panel may include a compensation element configured to fill a gap between one of the ends of the panel body and a respective fitting at an inclined position of the panel body. In the inclined position of the panel body with respect to the fitting, a favorable visual impression of the overall communication patch panel may be achieved by the compensation element.

In some embodiments, the compensation element may be a wedge.

In some embodiments, the compensation element may be a hinge, which may include a hinge shaft as well as a first hinge arm and a second hinge arm connected to each other by the hinge shaft, wherein the first hinge arm is configured for connection with a respective end of the panel body, and the second hinge arm is configured for connection with a respective fitting.

In some embodiments, the compensation element may be a movable member.

In some embodiments, the movable member is drawable and rotatable with respect to a respective end of the panel body.

In some embodiments, the movable member may include a first portion drawable with respect to a respective end of the panel body and a second portion that is hinged to the first portion for connection with a respective fitting.

In some embodiments, each of the fittings may be an L-shaped member, one arm of which is configured to be mounted on the communication rack, and the other arm of which is detachably connected to a respective end of the panel body.

In some embodiments, the panel body may include an integral linear frame or include two angled frame elements that are hinged to each other.

There is also claimed a communication rack system comprising two racks opposed to one another and at least one communication patch panel according to the present invention.

It is to be noted that, various technical features recited in the present application may be randomly combined with each other as long as they are not contradictory to one another. All combinations of features that are technically feasible are the technical contents contained in the present application.

BRIEF DESCRIPTION OF THE DRAWINGS

The present invention will be described below in more detail by means of specific embodiments with reference to accompanying drawings. Among them.

EMBODIMENTS

In the following detailed description, some specific details are elaborated to facilitate adequate understanding of the present invention. However, those skilled in the art will appreciate that, the present invention is not limited to these specific details.

A communication patch panel and a communication rack system may manage and organize input and output cables, which, for example, may be used in high speed data networks. The cables may be for example copper wires or optical fiber cables.

Figure 1:
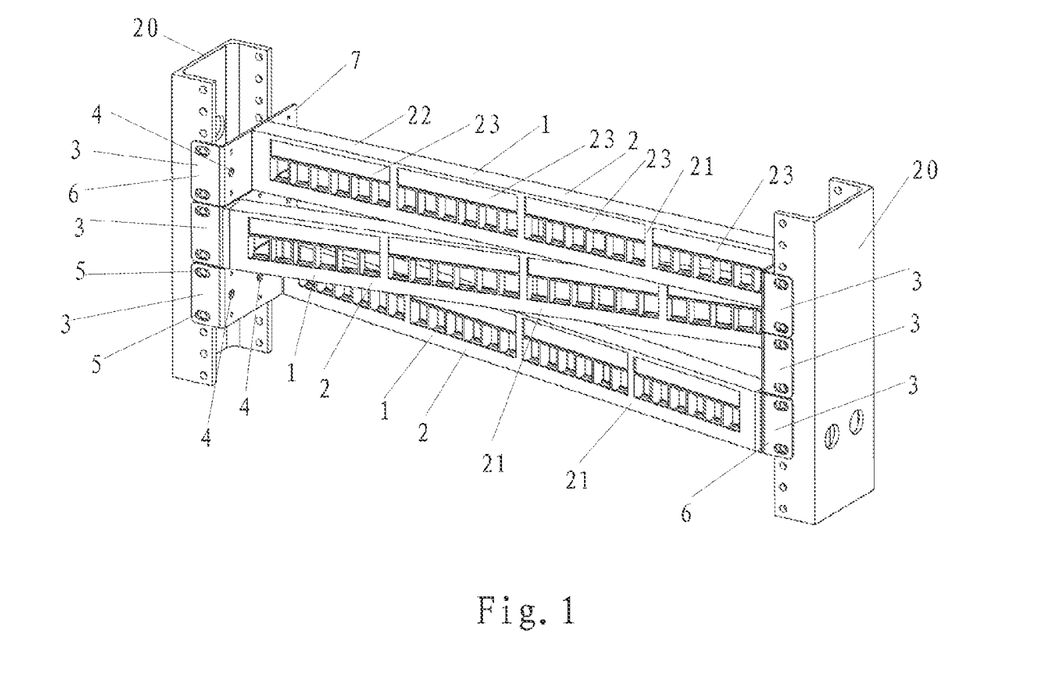
FIG. 1 is a partial perspective view of a communication rack system.

FIG. 1 is a partial perspective view of a communication rack system, wherein two communication racks 20 of the communication rack system are partially described. The two communication racks 20, which may for example extend vertically in parallel with respect to each other, have a height of about 2 m, and have a U-shaped cross section. Each of the communication racks 20 has many mounting positions in an extension height thereof. The two communication racks 20 may be mounted with many communication patch panels 1, which are arranged side by side with each other. Three of the communication patch panels 1 adjacent to each other are shown in FIG. 1.

The communication patch panel 1 includes a panel body 2 having two ends as well as a front side 21 that can be seen in FIG. 1 and a rear side opposite to the front side that cannot be seen in FIG. 1. The panel body 2 may include an integral linear frame 22, in which one or more connector modules 23 having a plurality of connectors may be arranged, wherein a plurality of input cables leading to the communication patch panel 1 may be connected to the connectors on the front side 21 of the panel body 2, and a plurality of output cables departing from the communication patch panel 1 may be connected to the connectors on the rear side of the panel body 2. Four connector modules 23, which are exemplarily arranged in a row, can be seen in FIG. 1. It is also possible, for example, to arrange two rows of connector modules. The communication patch panel 1 may have any type of connectors, such as an RJ45 connector, an RS232 connector, an optical fiber connector, or the like at any performance levels. The frame 22 may be made from any suitable material, for example metal, plastic or composite materials.

In some other embodiments not shown, the panel body 2 may also include two frame elements that are hinged to each other to form a fixed angle, which may be, for example, 120° or 150°. One or more connector modules may be provided in each of the frame elements.

The communication patch panel 1 includes two fittings 3, each of which is configured to be mounted on a communication rack 20 (for example, a pair of mounting holes 5 for bolts may be provided in each of the fittings 3) and to be detachably connected to one of the ends of the panel body 2, wherein each of the fittings 3 may provide a plurality of transverse positions for the detachable connection. To this end, each of the fittings 3 may for example have a plurality of mounting holes 4 (the number is three in the drawings) which are distributed in a transverse direction, for example uniformly distributed. The mounting holes 4 of the two fittings 3 may have the same layout, especially mirror-symmetrical to each other.

By way of a plurality of mounting positions for the two ends of the panel body 2 on the two fittings 3, many positionings of the panel body 2 may be realized, so that a desired positioning may be flexibly selected from these positionings. In the embodiment shown in FIG. 1, an upper communication panel body 2 is respectively connected to intermediate mounting holes 4 of the fittings 3, and thus is located at a position in parallel with respect to a width direction of the communication racks 20 and sunk with respect to an outer side of the communication racks 20; an intermediate communication rack body 2 is connected at one end thereof to an outer mounting hole 4 of one of the fittings 3, and at the other end thereof to an inner mounting hole 4 of the other of the fittings 3, and thus is located at a position inclined with respect to the width direction of the communication racks 20; and a lower communication panel body 2 is connected at one end thereof to an inner mounting hole 4 of the one of the fittings 3, and at the other end thereof to an outer mounting hole 4 of the other of the fittings 3, and thus is located at a position inclined oppositely with respect to the width direction of the communication racks 20.

Each of the fittings 3 may be an L-shaped member. One of the arms 6 of the L-shaped member may be configured to be mounted on the communication rack 20, for example it may be fixed on the communication rack by means of fastening elements that pass through the mounting holes 5. The other arm 7 of the L-shaped member may be detachably connected to one of the ends of the panel body 2. As an alternative, U-shaped fittings or fittings having other suitable shapes are also conceivable.

FIGS. 2A to 2E are perspective views of a communication patch panel 1 in different mounted states according to an embodiment of the present invention. In the mounted state shown in FIG. 2A, a communication panel body 2 is connected to respective outer mounting holes 4 of the fittings 3, and thus is located at a position substantially aligned with an outer side of the communication racks 20 and parallel to a width direction of the communication racks. In the mounted state shown in FIG. 2B, the communication panel body 2 is connected to respective intermediate mounting holes 4 of the fittings 3, and thus is located at a position sunk with respect to the outer side of the communication racks 20 and parallel to the width direction of the communication racks. In the mounted state shown in FIG. 2C, the communication panel body 2 is connected to respective inner mounting holes 4 of the fittings 3, and thus is located at a position further sunk with respect to the communication racks 20 and parallel to the width direction of the communication racks. In the mounted state shown in FIG. 2D, the communication panel body 2 is connected at one end thereof to an outer mounting hole 4 of one of the fittings 3, and at the other end thereof to an inner mounting hole 4 of the other of the fittings 3, and thus is located at a position inclined with respect to the width direction of the communication racks 20. In the mounted state shown in FIG. 2E, the communication panel body 2 is connected at one end thereof to an inner mounting hole 4 of the one of the fittings 3, and at the other end thereof to an outer mounting hole 4 of the other of the fittings 3. Therefore, as compared with the mounted state shown in FIG. 2E, the communication panel body 2 is located at a position inclined oppositely with respect to the width direction of the communication rack 20.

Figure 2A:
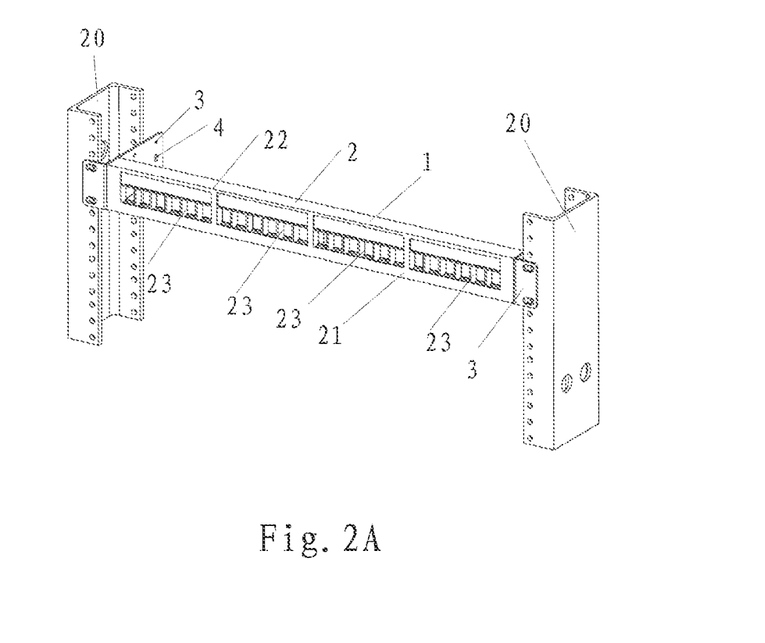
FIGS. 2A-2E are perspective views of a communication patch panel in different mounted states according to an embodiment of the present invention.
Figure 2B:
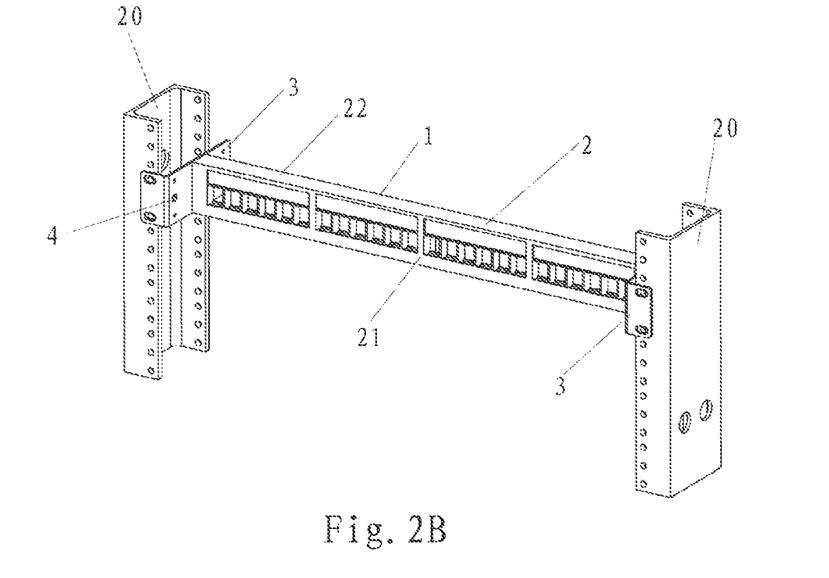
Figure 2C:
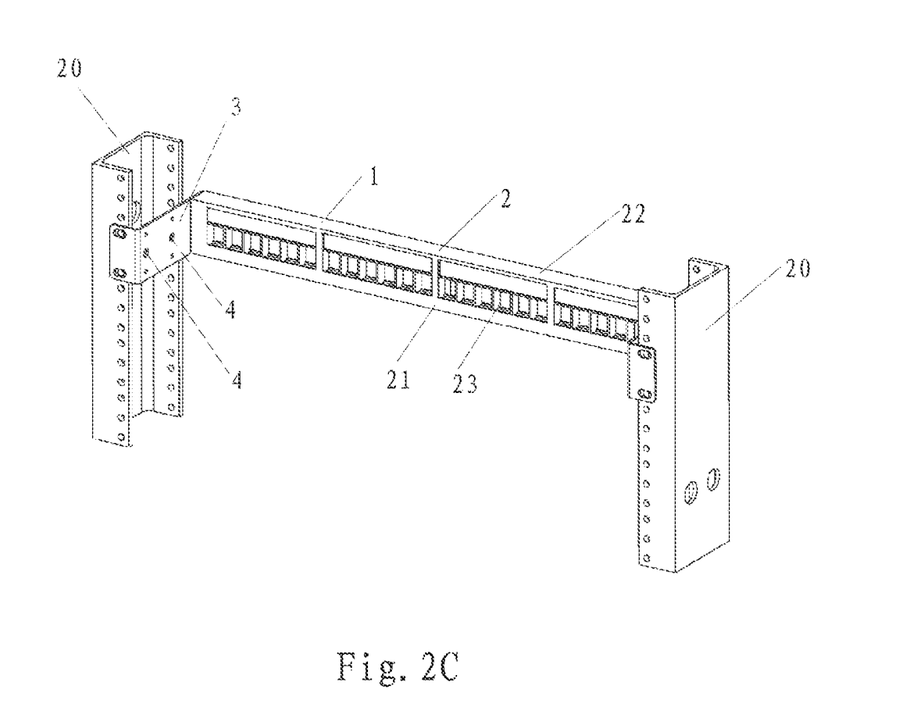
Figure 2D:
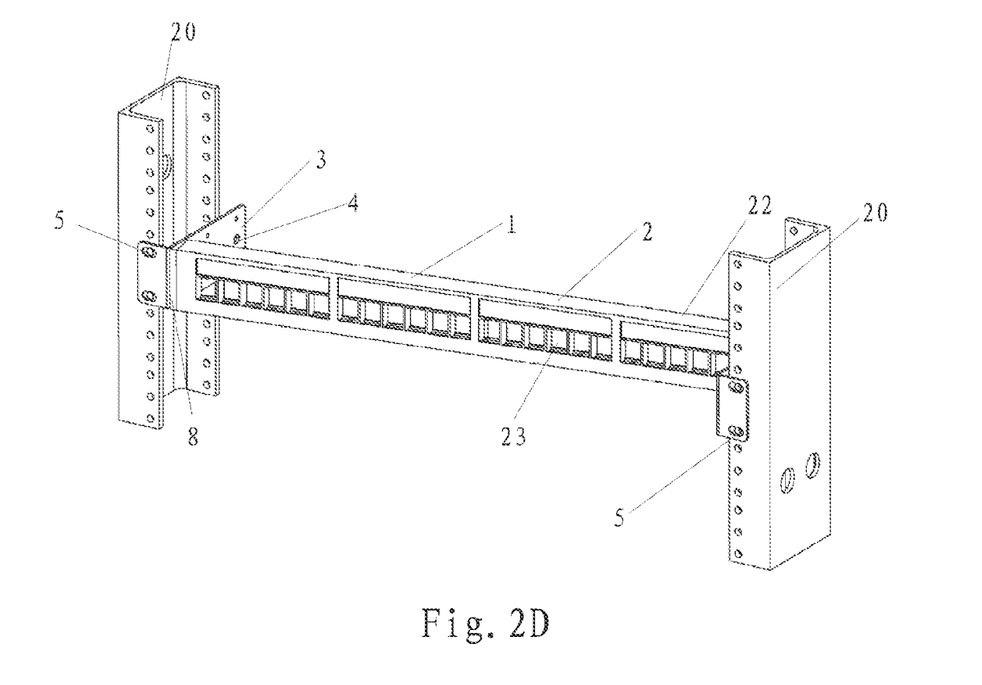
Figure 3A:
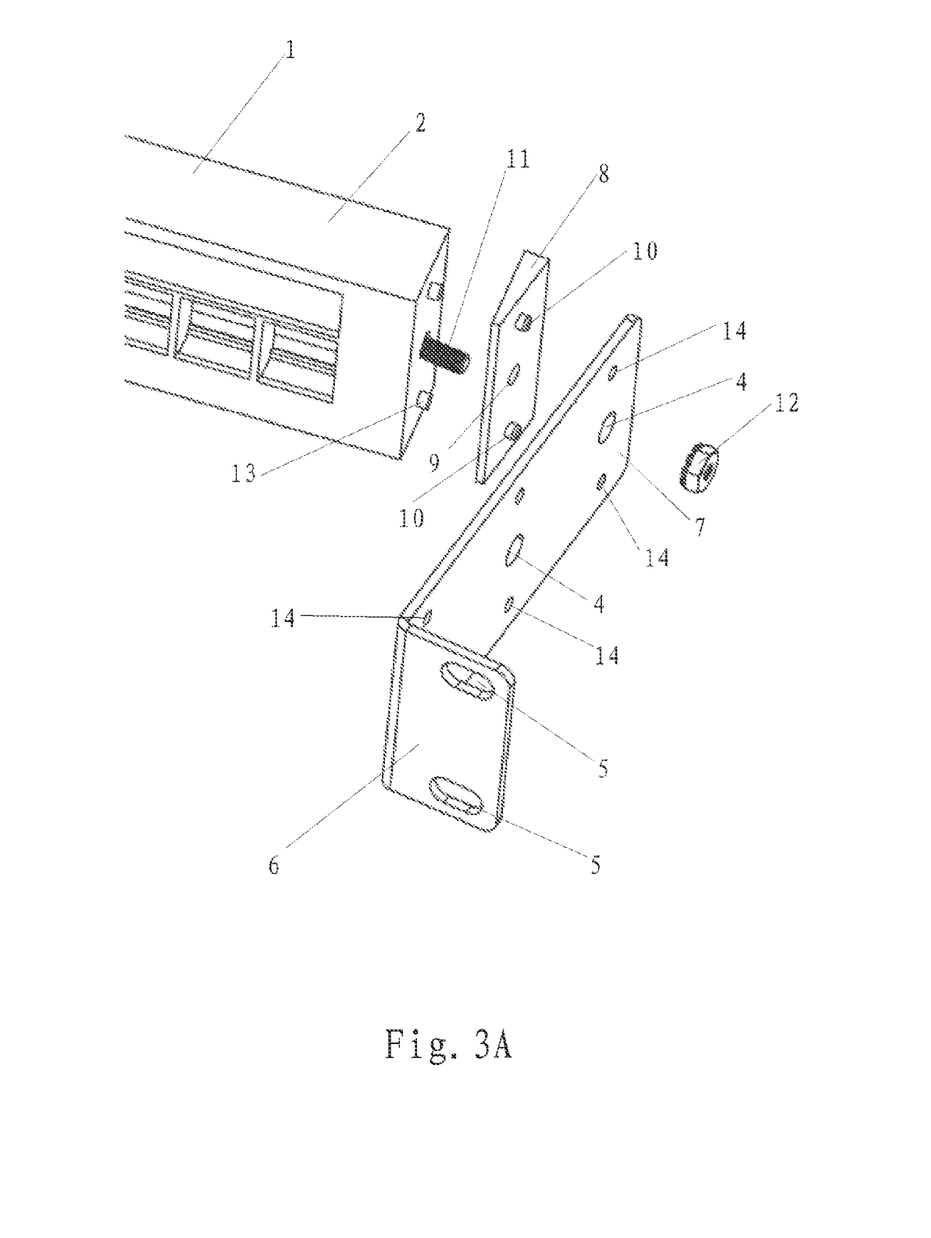
FIGS. 3A-3C are a partially enlarged exploded view, a partial horizontal perspective cross-sectional view, and a partial horizontal cross-sectional view of a right side of the communication patch panel of FIG. 2D.
Figure 3B:
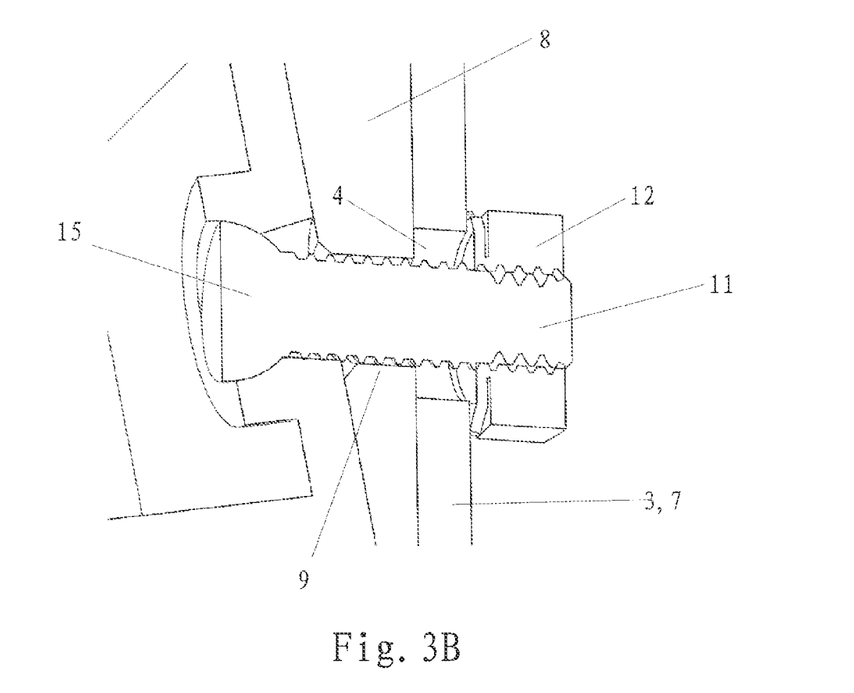
Figure 3C:
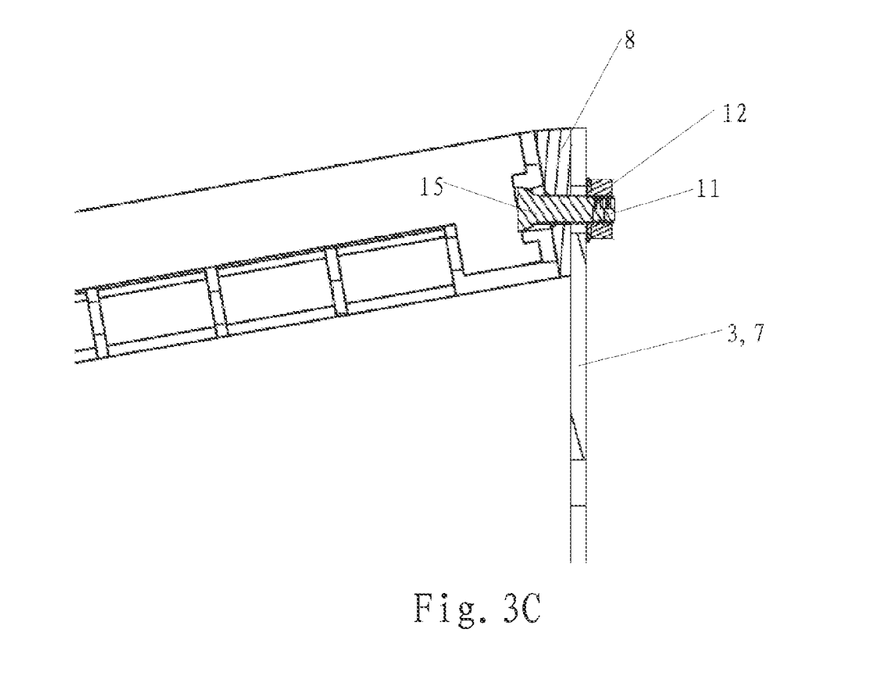

FIG. 3A is a partially enlarged exploded view of a right side of the communication patch panel of FIG. 2D. FIGS. 3B-3C are a partial horizontal perspective cross-sectional view and a partial horizontal cross-sectional view of the right side of the communication patch panel of FIG. 2D, wherein the cross-section is in a horizontal plane and extends through a longitudinal axis of the bolt. The detachable connection of the fitting 3 to the respective end of the panel body 2 may be a bolted connection. For this purpose, the panel body 2 may include a bolt hole for receiving the bolt 11, wherein a bolt head 15 of the bolt and the bolt hole may have spherical surfaces mated with each other, by means of which it is possible to achieve a variable orientation of the bolt 11, so that a reliable bolted connection can be achieved at an inclined position of the panel body 2 with respect to the width direction of the racks. The bolt 11 may be provided with a nut 12 which may be a separate nut, or a stand-off provided in the mounting hole 4 of the fitting 3. As an alternative to the nut, a simple shielding element may also be used, wherein the mounting hole 4 itself may be a threaded hole with an internal thread.

In addition, three hole groups in the second arm 7 of the fitting 3 may be seen from FIG. 3A, wherein each of the hole groups includes one mounting hole 4 and two positioning holes 14 adjacent to the mounting hole. The panel body 2 has two corresponding positioning pins 13 at the respective end thereof. When the end of the panel body 2 is in direct contact with the fitting 3, as in the mounted state shown in FIGS. 2A to 2C, the two positioning pins 13 may be inserted into the two positioning holes 14, thereby preventing the panel body 2 from torsion with respect to the fitting 3.

Figure 2E:
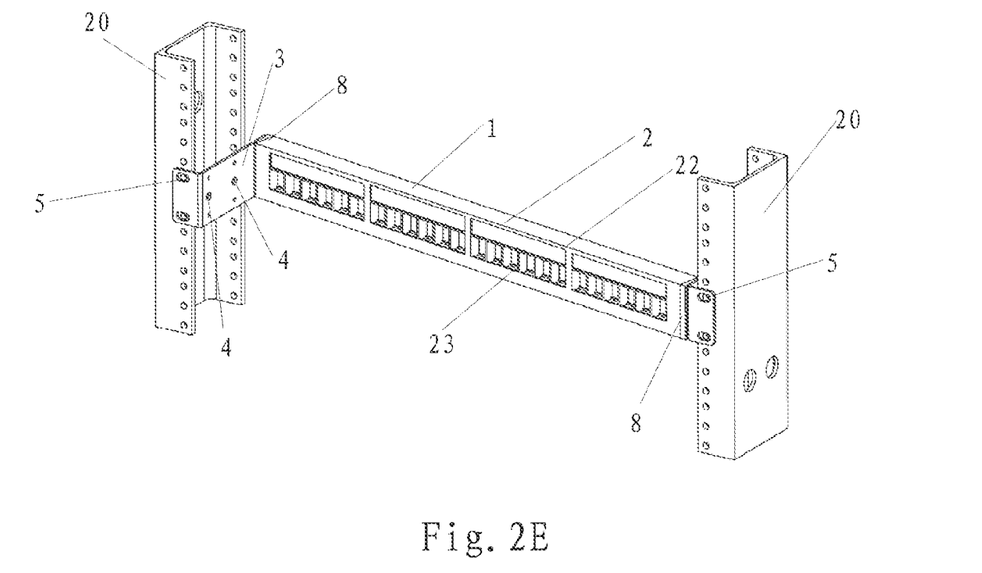

Furthermore, the communication patch panel 1 may further include a compensation element 8, which is configured to fill a gap between one of the ends of the panel body 2 and the respective fitting 3 at an inclined position of the panel body 2. Two such compensation elements 8 are used in FIGS. 2D and 2E respectively. As shown in FIG. 3A, the compensation element 8 may be a wedge. The wedge includes a mounting hole 9 through which the bolt 11 passes and two positioning pins 10 and two invisible positioning holes. In the mounted state as shown in FIGS. 2D and 2E, the two positioning pins 13 of the panel body 2 are inserted into the two positioning holes of the wedge, and the two positioning pins 10 of the wedge are inserted into the two positioning holes 14 of the fitting 3. The bolt 11 passes through not only the mounting hole 9 of the wedge but also one of the mounting holes 4 of the fitting 3.

Figure 4:
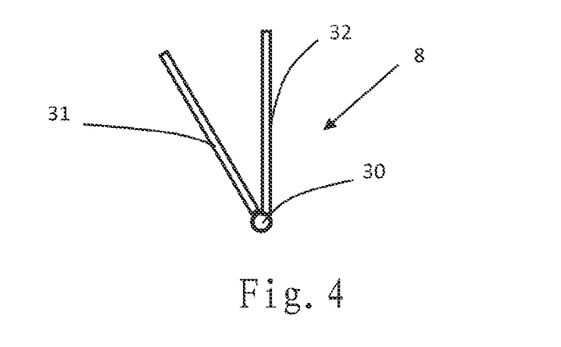
FIG. 4 is a schematic top view of a compensation element according to another embodiment of the present invention.

FIG. 4 is a schematic top view of a compensation element according to another embodiment of the present invention, wherein the compensation element 8 is constructed as a hinge including a hinge shaft 30 extending vertically, a first hinge arm 31 and a second hinge arm 32. The first hinge arm 31 may be fixedly connected to the end of the panel body 2, and the second hinge arm 32 may be fixedly connected to the fitting 3 through one of the mounting holes 4 of the fitting. By suitably selecting a thickness of the hinge in its closed state and an opening angle of the hinge, it is possible to compensate for a gap between the respective end of the panel body and the respective fitting in an inclined position of the communication patch panel.

Figure 5:
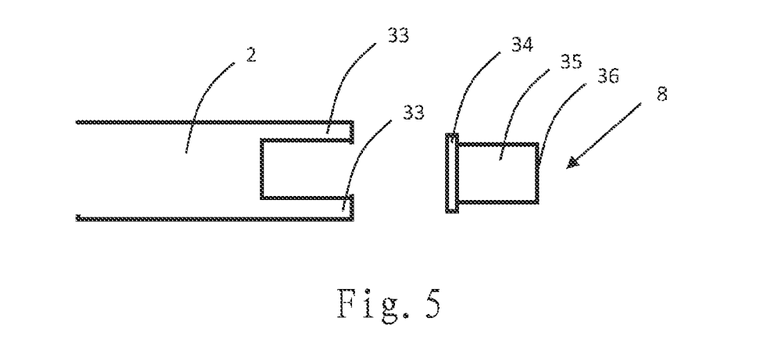
FIG. 5 is a schematic side view of a compensation element according to another embodiment of the present invention.

FIG. 5 is a schematic side view of a compensation element according to another embodiment of the present invention, wherein a panel body 2 is partially described in an area of one of the ends. The compensation element 8 may be a movable part drawable and rotatable with respect to the end of the panel body 2, wherein a length difference may be compensated by means of drawing, and an angle difference may be compensated by means of rotation. For this purpose, the panel body 2 may be constructed in a U-shape in the area of the end. The two legs 33 of the U-shape may respectively have a groove extending in a length direction of the panel body 2 (not shown), in which a pivot 34 of the compensation element 8 is received respectively. The pivot is arranged on one end side of a sheet 35 of the compensation element 8, and the compensation element 8 is connectable to the fitting 3 on the other opposite end side 36 of the sheet 35. For example, this may be realized by means of a bolted connection. When the panel body 2 is mounted as shown in FIGS. 2A to 2C, the compensation member 8 is completely received in the U-shape of the panel body 2, the sheet 35 is placed in the same plane as the panel body 2, and the end side 36 of the compensation element is flush with the end of the panel body. When the panel body 2 is mounted as shown in FIGS. 2D to 2E, the compensation element 8 is partially drawn out from the U-shape of the panel body 2, and the compensation element 8 rotates about the pivot 34, so that the end side 36 is attached against the surface of the fitting 3 in a planar manner.

Figure 6:
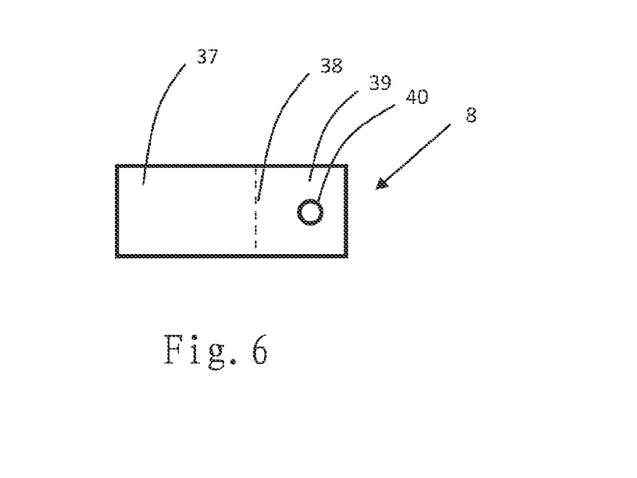
FIG. 6 is a schematic side view of a compensation element according to another embodiment of the present invention.

FIG. 6 is a schematic side view of a compensation element according to another embodiment of the present invention. The compensation element 8 may be a movable member including a first portion 37 drawable with respect to one of the ends of the panel body 2 and a second portion 39 that is hinged to the first portion, wherein the hinge 38 that connects the first portion 37 and the second portion 39 is indicated by a broken line in FIG. 6, and the first portion 37 and the second portion 39 are coplanarly depicted in FIG. 6. The second portion 39 is connectable to the fitting 3, for example by means of a bolted connection and thus the second portion includes a mounting hole 40 for a bolt. The panel body 2 may have grooves in the area of the respective end, for guiding the first portion 37 linearly in translation. The first portion 37 is in the same plane as the panel body 2. When the panel body 2 is mounted as shown in FIGS. 2A to 2C, the first portion 37 of the compensation element 8 is completely received in the area of the respective end of the panel body 2, the second portion 39 of the compensation element 8 is substantially perpendicular with respect to the first portion 37, and the mounting hole 40 is aligned with one of the mounting holes 4 of the fitting 3. When the panel body 2 is mounted as shown in FIGS. 2D to 2E, as compared with the mounted state as shown in FIGS. 2A to 2C, the compensation element 8 is drawn out partially from the respective end portion of the panel body 2, and the second portion 39 rotates with respect to the first portion 37 such that the second portion 39 is attached against the surface of the fitting 3 in a planar manner.

It will be understood that, the terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprise" and "include" (and variants thereof), when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being "on," "coupled to" or "connected to" another element, the element may be formed directly on, coupled to or connected to the other element, or there may be one or more intervening elements therebetween. In contrast, terms such as "directly on," "directly coupled to" and "directly connected to," when used herein, indicate that no intervening elements are present. Other words used to describe the relationship between elements should be interpreted in a like fashion (i.e., "between" versus "directly between", "attached" versus "directly attached," "adjacent" versus "directly adjacent", etc.). Terms such as "top," "bottom," "upper," "lower," "above," "below," and the like are used herein to describe the relationship of one element, layer or region to another element, layer or region as illustrated in the figures. It will be understood that these terms are intended to encompass different orientations of the device in addition to the orientation depicted in the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

It will also be appreciated that all example embodiments disclosed herein can be combined in any way.

Finally, it is to be noted that, the above-described embodiments are merely for understanding the present invention but not constitute a limit on the protection scope of the present invention. For those skilled in the art, modifications may be made on the basis of the above-described embodiments, and these modifications do not depart from the protection scope of the present invention.

What is claimed is:

1. A communication patch panel including:
a panel body having two ends as well as a front side and a rear side, wherein the communication patch panel includes two fittings, each of which is configured to be mounted on a communication rack and to be detachably connected to one of the ends of the panel body, wherein each of the fittings provides a plurality of transverse positions for the detachable connection, and wherein the plurality of transverse positions are parallel to one another across the two fittings, respectively, to allow the panel body to be selectively mounted with respect to a width direction of the communication racks;
wherein each of the two fittings includes a plurality of mounting holes, which are distributed in a transverse direction;
wherein the panel body is mountable to the two fittings in a plurality of positions;
wherein the panel body is mountable in a first position which is parallel to a front of the communication rack;
wherein the panel body is mountable in a second position which is parallel to the front of the communication rack, and located rearwardly relative to the first position;
wherein the panel body is mountable in a third position which is parallel to the front of the communication rack, and located rearwardly relative to the second position;
wherein the panel body is mountable in a fourth position which is inclined relative to the front of the communication rack; and
wherein the panel body is mountable in a fifth position which is inclined relative to the front of the communication rack in an opposite direction to an incline of the fourth position.

2. The communication patch panel of claim 1, wherein the plurality of mounting holes are uniformly distributed in the transverse direction in the respective fittings.

3. The communication patch panel of claim 1, wherein the number of the plurality of mounting holes in each of the fittings is three or four.

4. The communication patch panel of claim 1, wherein the two fittings have the same layout of mounting holes.

5. The communication patch panel of claim 4, wherein the mounting holes of the two fittings are mirror-symmetrical to each other.

6. The communication patch panel of claim 1, wherein the detachable connection is a bolted connection.

7. The communication patch panel of claim 6, wherein the panel body includes a bolt hole for receiving a bolt wherein a bolt head of the bolt and the bolt hole have spherical surfaces mated with each other.

8. The communication patch panel of claim 1, wherein the communication patch panel further includes a compensation element, which is configured to fill a gap between one of the ends of the panel body and a respective one of the fittings at an inclined position of the panel body.

9. The communication patch panel of claim 8, wherein the compensation element is a wedge.

10. The communication patch panel of claim 8, wherein the compensation element is a hinge, which includes a hinge shaft, a first hinge arm, and a second hinge arm connected to each other by the hinge shaft, wherein the first hinge arm is configured for connection with a respective one of the ends of the panel body, and the second hinge arm is configured for connection with a respective one of the fittings.

11. The communication patch panel of claim 8, wherein the compensation element is a movable member, which is drawable and rotatable with respect to a respective one of the ends of the panel body.

12. The communication patch panel of claim 8, wherein the compensation element is a movable member, which includes a first portion drawable with respect to a respective one of the ends of the panel body and a second portion hinged to the first portion for connection with a respective one of the fittings.

13. The communication patch panel of claim 1, wherein each of the fittings is an L-shaped member, one arm of which is configured to be mounted on the communication rack, and the other arm of which is detachably connected to a respective one of the ends of the panel body.

14. The communication patch panel of claim 1, wherein the panel body includes an integral linear frame.

15. A communication rack system including two communication racks that are opposed to one another, wherein the communication rack system includes at least one communication patch panel according to claim 1.

16. A communication patch panel including:
a panel body having two ends as well as a front side and a rear side, wherein the communication patch panel includes two fittings, each of which is configured to be mounted on a communication rack and to be detachably connected to one of the ends of the panel body, wherein each of the fittings provides a plurality of transverse positions for the detachable connection; and
a compensation element, which is configured to fill a gap between one of the ends of the panel body and a respective one of the fittings at an inclined position of the panel body.

17. The communication patch panel of claim 16, wherein the compensation element is a wedge.

18. The communication patch panel of claim 16, wherein the compensation element is a hinge, which includes a hinge shaft, a first hinge arm, and a second hinge arm connected to each other by the hinge shaft, wherein the first hinge arm is configured for connection with a respective one of the ends of the panel body, and the second hinge arm is configured for connection with a respective one of the fittings.

19. The communication patch panel of claim 16, wherein the compensation element is a movable member, which is drawable and rotatable with respect to a respective one of the ends of the panel body.

20. The communication patch panel of claim 16, wherein the compensation element is a movable member, which includes a first portion drawable with respect to a respective one of the ends of the panel body and a second portion hinged to the first portion for connection with a respective one of the fittings.

21. A communication patch panel including:
a panel body having two ends as well as a front side and a rear side, wherein the communication patch panel includes two fittings, each of which is configured to be mounted on a communication rack and to be detachably connected to one of the ends of the panel body, wherein each of the two fittings provides a plurality of transverse positions for the detachable connection, and wherein the plurality of transverse positions are parallel to one another across the two fittings, respectively, to allow the panel body to be selectively mounted with respect to a width direction of the communication rack;
wherein the communication patch panel further includes a compensation element, which is configured to fill a gap between one of the ends of the panel body and a respective one of the two fittings at an inclined position of the panel body.

* * * * *

UNITED STATES PATENT AND TRADEMARK OFFICE
CERTIFICATE OF CORRECTION

PATENT NO. : 11,509,975 B2
APPLICATION NO. : 16/952465
DATED : November 22, 2022
INVENTOR(S) : Zhihui Liu It is certified that error appears in the above-identified patent and that said Letters Patent is hereby corrected as shown below:

In the Claims

Column 7, Line 64, Claim 1: "the communication racks;" should read --the communication rack;--

Signed and Sealed this
Seventh Day of March, 2023

Katherine Kelly Vidal
*Director of the United States Patent and Trademark Office*